(12) United States Patent
Maher et al.

(10) Patent No.: US 11,977,178 B2
(45) Date of Patent: May 7, 2024

(54) MULTI-CHIP SYNCHRONIZATION FOR DIGITAL RADARS

(71) Applicant: UHNDER, INC., Austin, TX (US)

(72) Inventors: Monier Maher, St. Louis, MO (US); Marius Goldenberg, Austin, TX (US); Chung-Kai Chow, Austin, TX (US); Frederick Rush, Austin, TX (US); Otto A. Schmid, Morgantown, WV (US)

(73) Assignee: Uhnder, Inc., Austin, TX (US)

( * ) Notice: Subject to any disclaimer, the term of this patent is extended or adjusted under 35 U.S.C. 154(b) by 510 days.

(21) Appl. No.: 16/816,899

(22) Filed: Mar. 12, 2020

(65) Prior Publication Data
US 2020/0292666 A1 Sep. 17, 2020

Related U.S. Application Data

(60) Provisional application No. 62/816,941, filed on Mar. 12, 2019.

(51) Int. Cl.
G01S 7/35 (2006.01)
G01S 7/40 (2006.01)
(Continued)

(52) U.S. Cl.
CPC ............ G01S 7/354 (2013.01); G01S 7/40 (2013.01); G01S 7/4017 (2013.01);
(Continued)

(58) Field of Classification Search
CPC .......... G01S 7/354; G01S 7/40; G01S 7/4017; G01S 13/325; G01S 13/36; G01S 7/356; G01S 7/358; G01S 13/931; G01S 13/584
(Continued)

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0725480 11/2011
EP 2374217 4/2013
(Continued)

OTHER PUBLICATIONS

B.P.Ginsburgetal., "Amultimode76-to-81GHzautomotiveradartransceiverwithautonomousmonitoring,"2018IEEE InternationalSolid-StateCircuitsConference—(ISSCC),2018,pp. 158-160,doi:10.1109/ISSCC.2018.8310232. (Year: 2018).*
(Continued)

Primary Examiner — Nuzhat Pervin
(74) Attorney, Agent, or Firm — Gardner, Linn, Burkhart & Ondersma LLP

(57) ABSTRACT

A multi-chip MIMO radar system includes a plurality of transmitters and a plurality of receivers. Each of the pluralities of transmitters and receivers are arranged across a plurality of chips. The multi-chip MIMO radar system is configured to provide an exemplary chip synchronization such that the transmitters and receivers of each chip of the radar system are synchronized with the transmitters and receivers of every other chip of the radar system.

20 Claims, 10 Drawing Sheets

(51) Int. Cl.
   *G01S 13/32* (2006.01)
   *G01S 13/36* (2006.01)
   *G01S 13/931* (2020.01)

(52) U.S. Cl.
   CPC ............ *G01S 13/325* (2013.01); *G01S 13/36* (2013.01); *G01S 7/356* (2021.05); *G01S 7/358* (2021.05); *G01S 13/931* (2013.01)

(58) Field of Classification Search
   USPC ........................................................ 342/173
   See application file for complete search history.

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,766,554 A | 10/1973 | Tresselt | |
| 3,896,434 A | 7/1975 | Sirven | |
| 3,932,871 A | 1/1976 | Foote | |
| 4,078,234 A | 3/1978 | Fishbein et al. | |
| 4,176,351 A | 11/1979 | Vita et al. | |
| 4,308,536 A | 12/1981 | Sims, Jr. et al. | |
| 4,566,010 A | 1/1986 | Collins | |
| 4,612,547 A | 9/1986 | Itoh | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,012,254 A | 4/1991 | Thompson | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,361,072 A | 11/1994 | Barrick et al. | |
| 5,376,939 A | 12/1994 | Urkowitz | |
| 5,379,322 A | 1/1995 | Kosaka et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,691,724 A * | 11/1997 | Aker ........................ | G01S 7/032 342/115 |
| 5,712,640 A | 1/1998 | Andou | |
| 5,724,041 A | 3/1998 | Inoue et al. | |
| 5,847,661 A | 12/1998 | Ricci | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,970,400 A | 10/1999 | Dwyer | |
| 6,048,315 A | 4/2000 | Chiao et al. | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,208,248 B1 | 3/2001 | Ross | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,547,733 B2 | 4/2003 | Hwang et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,693,582 B2 * | 2/2004 | Steinlechner ......... | G01S 7/0234 342/134 |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,888,491 B2 | 5/2005 | Richter | |
| 6,975,246 B1 | 12/2005 | Trudeau | |
| 7,066,886 B2 | 6/2006 | Song et al. | |
| 7,119,739 B1 | 10/2006 | Struckman | |
| 7,130,663 B2 | 10/2006 | Guo | |
| 7,202,776 B2 | 4/2007 | Breed | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,667,637 B2 | 2/2010 | Pedersen et al. | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,115,672 B2 | 2/2012 | Nouvel et al. | |
| 8,154,436 B2 | 4/2012 | Szajnowski | |
| 8,169,359 B2 | 5/2012 | Aoyagi | |
| 8,212,713 B2 | 7/2012 | Aiga et al. | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,686,898 B2 * | 4/2014 | Beasley ................... | H03C 1/00 342/195 |
| 8,694,306 B1 | 4/2014 | Short et al. | |
| 8,994,581 B1 | 3/2015 | Brown | |
| 9,121,943 B2 | 9/2015 | Stirlin-Gallacher et al. | |
| 9,239,378 B2 | 1/2016 | Kishigami et al. | |
| 9,239,379 B2 | 1/2016 | Burgio et al. | |
| 9,274,217 B2 | 3/2016 | Change et al. | |
| 9,282,945 B2 | 3/2016 | Smith et al. | |
| 9,335,402 B2 | 5/2016 | Maeno et al. | |
| 9,400,328 B2 | 7/2016 | Hsiao et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,720,073 B1 | 8/2017 | Davis et al. | |
| 9,726,756 B2 * | 8/2017 | Jansen ..................... | G01S 13/87 |
| 9,720,080 B1 | 9/2017 | Rodenbeck | |
| 9,753,121 B1 | 9/2017 | Davis | |
| 9,753,132 B1 | 9/2017 | Bordes et al. | |
| 9,772,397 B1 * | 9/2017 | Bordes .................. | G01S 7/0232 |
| 9,791,551 B1 | 10/2017 | Eshraghi et al. | |
| 9,791,564 B1 | 10/2017 | Harris et al. | |

(56) References Cited

U.S. PATENT DOCUMENTS

| | | |
|---|---|---|
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 10,092,192 B2 | 10/2018 | Lashkari et al. |
| 10,097,287 B1* | 10/2018 | Schat .................. G01S 13/931 |
| 10,324,165 B2* | 6/2019 | Bordes ................. G01S 13/325 |
| 10,641,881 B2* | 5/2020 | Searcy .................. G01S 7/032 |
| 10,659,078 B2* | 5/2020 | Nayyar ................ H04J 3/0685 |
| 10,673,444 B2* | 6/2020 | Chi ........................ G01S 7/354 |
| 10,782,389 B2* | 9/2020 | Rao ..................... G01S 13/343 |
| 11,054,516 B2* | 7/2021 | Wu ......................... G01S 7/354 |
| 11,296,806 B2* | 4/2022 | Coulter ................ H04J 3/0673 |
| 11,428,778 B2* | 8/2022 | Bauduin ................ G01S 7/038 |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0070532 A1 | 4/2004 | Ishii et al. |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2005/0008065 A1 | 1/2005 | Schilling |
| 2005/0069162 A1 | 3/2005 | Haykin |
| 2005/0090274 A1 | 4/2005 | Miyashita |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0220943 A1 | 10/2006 | Schlick et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0080599 A1 | 4/2008 | Kang et al. |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0021421 A1* | 1/2009 | Wakayama ............. G01S 7/354 342/175 |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0234448 A1 | 9/2011 | Hayase |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |

(56) References Cited

U.S. PATENT DOCUMENTS

| | | |
|---|---|---|
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0049423 A1* | 2/2014 | De Jong .............. G01S 13/536 342/25 A |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1* | 6/2015 | Jansen .................. G01S 7/032 342/195 |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2015/0373167 A1* | 12/2015 | Murashov .......... H04L 69/321 370/392 |
| 2016/0003938 A1 | 1/2016 | Gazit et al. |
| 2016/0003939 A1 | 1/2016 | Stainvas Olshansky et al. |
| 2016/0018511 A1* | 1/2016 | Nayyar ................ G01S 13/931 342/27 |
| 2016/0025844 A1* | 1/2016 | Mckitterick .......... G01S 7/4004 342/21 |
| 2016/0005444 A1 | 2/2016 | Kuo et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1* | 10/2017 | Stark .................. G01S 13/87 |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |
| 2017/0363731 A1* | 12/2017 | Bordes ................ G01S 7/354 |
| 2018/0175907 A1 | 1/2018 | Marr |
| 2018/0031674 A1* | 2/2018 | Bordes ................ G01S 7/0234 |
| 2018/0031675 A1* | 2/2018 | Eshraghi .............. G01S 13/347 |
| 2018/0074168 A1 | 3/2018 | Subburaj et al. |
| 2018/0231655 A1* | 8/2018 | Stark .................. H04B 17/309 |
| 2018/0231656 A1* | 8/2018 | Maher .................. G01S 7/354 |
| 2018/0329027 A1* | 11/2018 | Eshraghi .............. G01S 7/038 |
| 2019/0293755 A1* | 9/2019 | Cohen .................. G01S 7/295 |
| 2020/0191940 A1* | 6/2020 | Wu ...................... H04B 7/0413 |

FOREIGN PATENT DOCUMENTS

| | | | |
|---|---|---|---|
| EP | 2821808 | 7/2015 | |
| EP | 3499264 B1 * | 7/2020 | .......... G01S 13/003 |
| FR | 2751086 | 1/1998 | |
| WO | WO-2012115518 A1 * | 8/2012 | ............ G01S 13/34 |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | WO2017175190 | 10/2017 | |
| WO | WO2017187330 | 11/2017 | |

OTHER PUBLICATIONS

International Search Report and Written Opinion of corresponding PCT Application No. PCT/IB2020/052253, dated Jul. 20, 2020.

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS,"in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

* cited by examiner ated circuit chip and a second integrated circuit chip. The first integrated circuit chip includes a first plurality of transmitters and a first plurality of receivers. The second integrated circuit chip includes a second plurality of transmitters and a second plurality of receivers. The first integrated circuit chip is a master chip and the second integrated circuit chip is a slave chip. The first integrated circuit chip includes a synchronization clock operable to synchronize the operation of each of the first and second integrated circuit chips.

MULTI-CHIP SYNCHRONIZATION FOR DIGITAL RADARS

CROSS REFERENCE TO RELATED APPLICATIONS

The present application claims the filing benefits of U.S. provisional application, Ser. No. 62/816,941, filed Mar. 12, 2019, which is hereby incorporated by reference herein in its entirety.

FIELD OF THE INVENTION

The present invention is directed to radar systems, and in particular to digital radar systems.

BACKGROUND OF THE INVENTION

The use of radar to determine location and velocity of objects in an environment is important in a number of applications including, for example, automotive radar, industrial processes, and gesture detection. A radar system typically transmits radio signals and listens for the reflection of the radio signals from objects in the environment. By comparing the transmitted radio signals with the received radio signals, a radar system can determine the distance to an object, and the velocity of the object. Using multiple transmitters and/or receivers, or a movable transmitter or receiver, the location (angle) of an object can also be determined.

A radar system consists of transmitters and receivers. The transmitters generate a baseband signal which is up-converted to a radio frequency (RF) signal that propagates according to an antenna pattern. The transmitted signal is reflected off of object or targets in the environment. The received signal at each receiver is the totality of the reflected signal from all targets in the environment. The receiver down-converts the received signal to baseband and compares the baseband received signal to the baseband signal at one or more transmitters. This is used to determine the range, velocity, and angle of targets in the environment.

A MIMO radar system includes a plurality of transmitters and a plurality of receivers. Each of the plurality of transmitters is coupled to a corresponding antenna, and each of the plurality of receivers is coupled to a corresponding antenna. The transmitter and receiver antennas are used to form a first set of virtual antenna locations. The more virtual antennas the better the angular resolution.

SUMMARY OF THE INVENTION

Embodiments of the present invention provide methods and a system for synchronizing multiple radar chips so that they can be used together to improve performance and/or angular resolution (MIMO radar systems). By synchronizing the chips (each with separate radar systems), all the transmitters (TX's) of each chip can be aligned so that all TX's from different chips are synchronized. In addition, all receivers (RX's) can be aligned so that all RX's from different chips are synchronized, and therefore, more TX's and RX's can be used (even if on different radar system chips) to increase performance and/or angular resolution. Such synchronization is achieved by using available high frequency TX/RX, as well as a controller for controller the synchronization of the TX's and RX's.

A multi-chip MIMO radar system in accordance with an embodiment of the present invention includes a first integrated circuit chip and a second integrated circuit chip. The first integrated circuit chip includes a first plurality of transmitters and a first plurality of receivers. The second integrated circuit chip includes a second plurality of transmitters and a second plurality of receivers. The first integrated circuit chip is a master chip and the second integrated circuit chip is a slave chip. The first integrated circuit chip includes a synchronization clock operable to synchronize the operation of each of the first and second integrated circuit chips.

A method for synchronizing a multi-chip MIMO radar system in accordance with an embodiment of the present invention includes powering up the chips of the radar system. Transmitters and receivers of each chip are synchronized on an intra chip basis such that all the transmitters and receivers of each chip are synchronized. Roughly synchronizing a plurality of chips of the radar system, such that the plurality of chips are synchronized to within 10-100 ns. Performing a 2 GHz chip synchronization using a 2 GHz chip scan on a master chip of the plurality of chips. Performing a fine-tuned inter-chip synchronization by computing a sub-chip misalignment using inter-rangebin interpolation between the master chip and each slave chip of the plurality of chips. The sub-chip misalignment is corrected via pulse swallowing a required number of pulses, in 62.5 ps increments, to align the transmission scans. Finally, the synchronization is validated to ensure the transmission scans are synchronized to a desired sub-chip accuracy. As necessary, the method repeats the 2 GHz chip synchronization and the fine-tuned inter chip synchronization steps.

In an aspect of the present invention, an internal sync signal or START signal is used by each chip to synchronize their respective pluralities of transmitters and pluralities of receivers. The internal sync signal is used such that all transmitter dividers and receiver dividers will transition on a same edge of an LO 16 GHz input clock.

In another aspect of the present invention, for the rough inter chip synchronization, a 2 GHz signal may be used between the plurality of chips to synchronize internal timers. Roughly synchronized chips are synchronized to within 10-100 ns.

In a further aspect of the present invention, 2 GHz chip synchronization includes sending a small scan, such as one pulse repetition interval, using a known pattern from a master chip of the plurality of chips and correlating that pattern on the master chip and the slave chips of the plurality of chips. Using the correlation output, internal timer offsets of each slave chip may be adjusted such that subsequent scans will start with a desired clock boundary.

In another aspect of the present invention, fine-tuned inter chip synchronization includes the use of inter-range bin interpolation to compute a sub-chip misalignment between the master chip and the slave chips. With this sub-chip misalignment, pulse swallowing (in 62.5 ps increments) is used to remove the required number of clock pulses to ensure that the subsequent scans are aligned to the desired degree of synchronization.

In an aspect of the present invention, data converters are configured to operate at a divide down factor from 16 GHz LO.

In another aspect of the present invention, a single LO clock distribution network is used.

In yet another aspect of the present invention, local dividers in each chip are synchronized.

In a further aspect of the present invention, a first portion of a plurality of chips are used in a first scan, while a second portion of the plurality of chips are used for a second scan.

In another aspect of the present invention, a first portion of a plurality of chips performs a first portion of post processing of received data. A second portion of the plurality of chips performs a second portion of the post processing of the received data.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. Methods and systems of the present invention result in better performance from a radar system. An exemplary radar system provides an exemplary chip operating frequency for a multi-chip MIMO radar system. The MIMO radar system includes a plurality of transmitters and a plurality of receivers. Each of the plurality of transmitters is coupled to a corresponding antenna, and each of the plurality of receivers is coupled to a corresponding antenna. The transmitter and receiver antennas are used to form a set of virtual antenna locations.

Figure 1:
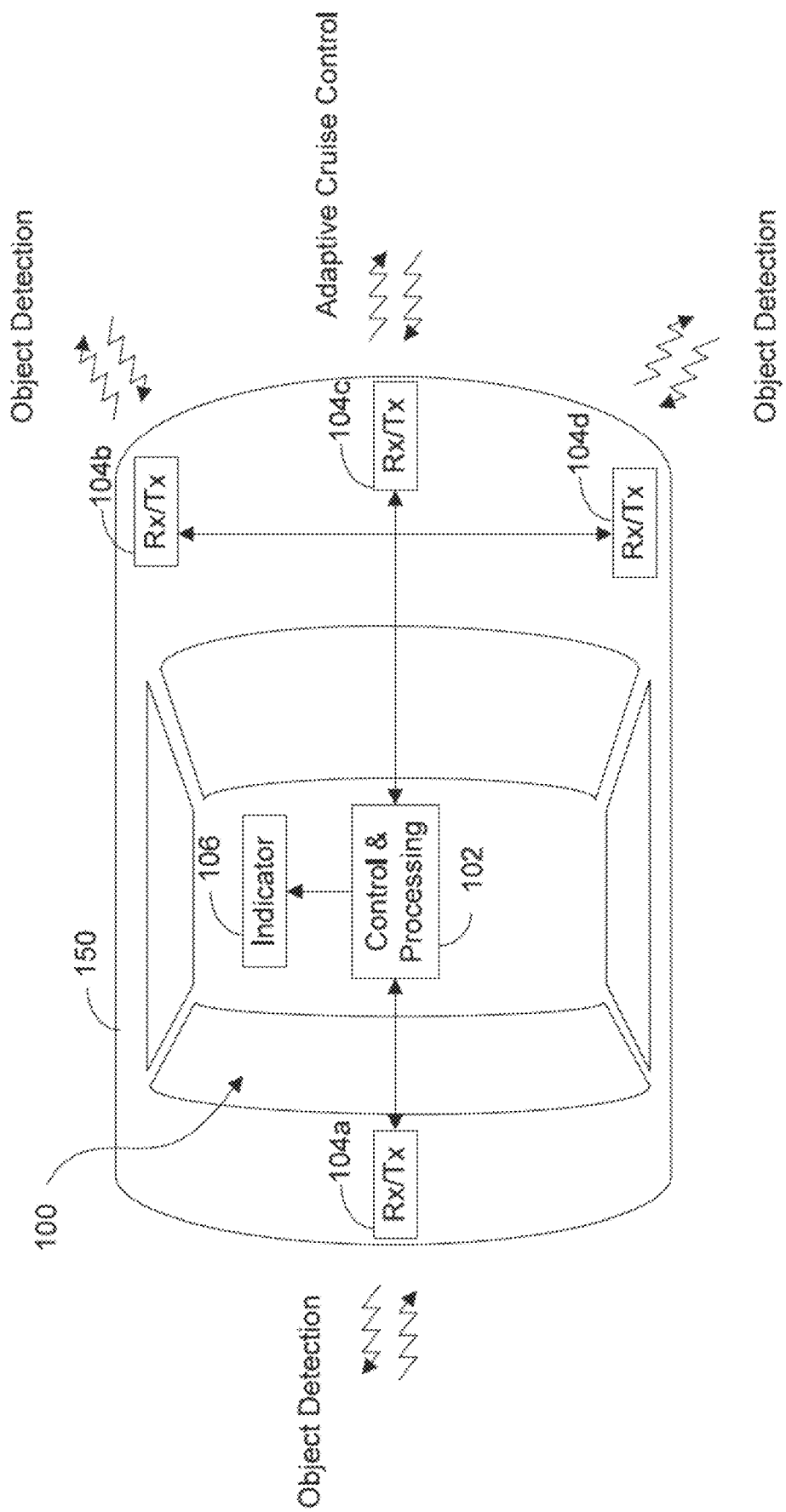
FIG. 1 is a plan view of an automobile equipped with a radar system in accordance with the present invention.

FIG. 1 illustrates an exemplary radar system 100 configured for use in a vehicle 150. In an aspect of the present invention, a vehicle 150 may be an automobile, truck, or bus, etc. The radar system 100 may utilize multiple radar systems (e.g., 104a-104d) embedded in the vehicle 150 (see FIG. 1). Each of these radar systems may employ multiple transmitters, receivers, and antennas (see FIG. 3). These signals are reflected from objects (also known as targets) in the environment and received by one or more receivers of the radar system. A transmitter-receiver pair is called a virtual radar (or sometimes a virtual receiver). As illustrated in FIG. 1, the radar system 100 may comprise one or more transmitters and one or more receivers (104a-104d) for a plurality of virtual radars. Other configurations are also possible. FIG. 1 illustrates the receivers/transmitters 104a-104d placed to acquire and provide data for object detection and adaptive cruise control. As illustrated in FIG. 1, a controller 102 receives and then analyzes position information received from the receivers 104a-104d and forwards processed information (e.g., position information) to, for example, an indicator 106 or other similar devices, as well as to other automotive systems. The radar system 100 (providing such object detection and adaptive cruise control or the like) may be part of an Advanced Driver Assistance System (ADAS) for the automobile 150.

An exemplary radar system operates by transmitting one or more signals from one or more transmitters and then listening for reflections of those signals from objects in the environment by one or more receivers. By comparing the transmitted signals and the received signals, estimates of the range, velocity, and angle (azimuth and/or elevation) of the objects can be estimated.

Figure 2B:
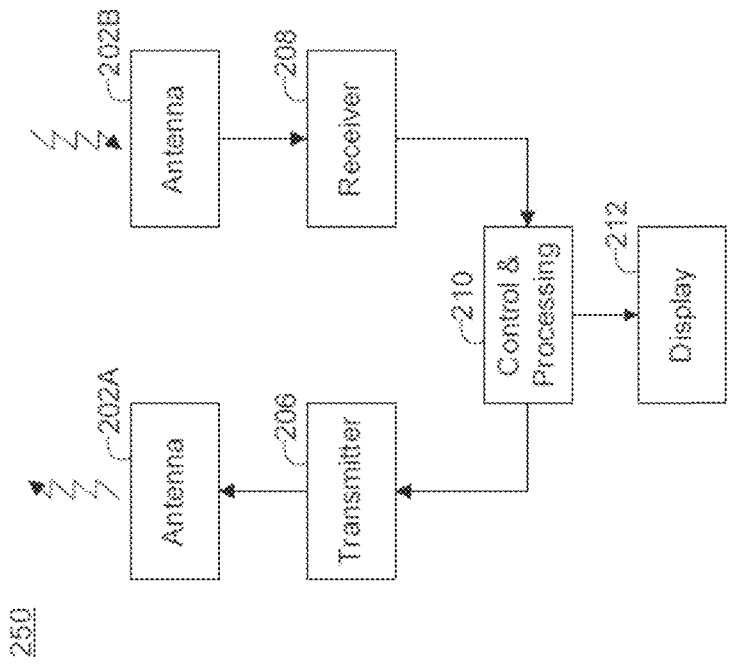
FIGS. 2A and 2B are block diagrams of radar systems in accordance with the present invention.
Figure 2A:
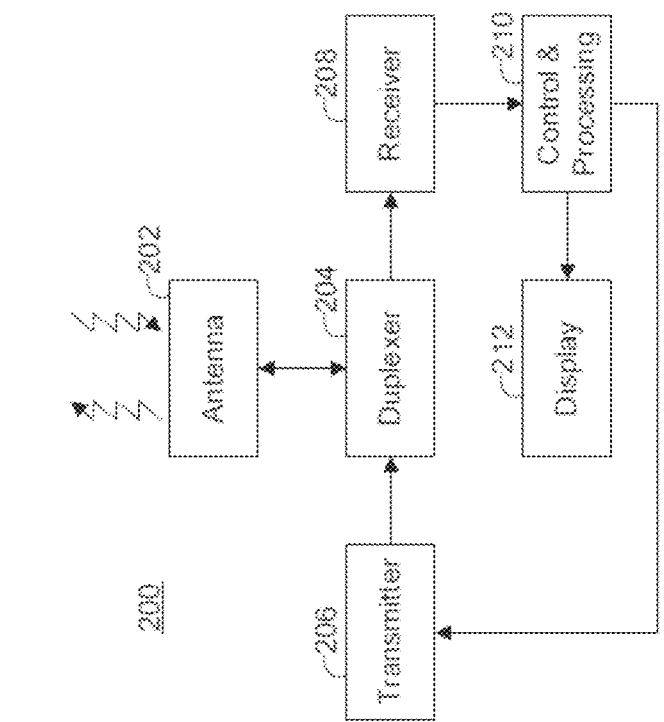

There are several ways to implement a radar system. One way, illustrated in FIG. 2A, uses a single antenna 202 for transmitting and receiving. The antenna 202 is connected to a duplexer 204 that routes the appropriate signal from the antenna 202 to a receiver 208 or routes the signal from a transmitter 206 to the antenna 202. A control processor 210 controls the operation of the transmitter 206 and the receiver 208 and estimates the range and velocity of objects in the environment. A second way to implement a radar system is shown in FIG. 2B. In this system, there are separate antennas for transmitting (202A) and receiving (202B). A control processor 210 performs the same basic functions as in FIG. 2A. In each case, there may be a display 212 to visualize the location of objects in the environment.

Figure 3:
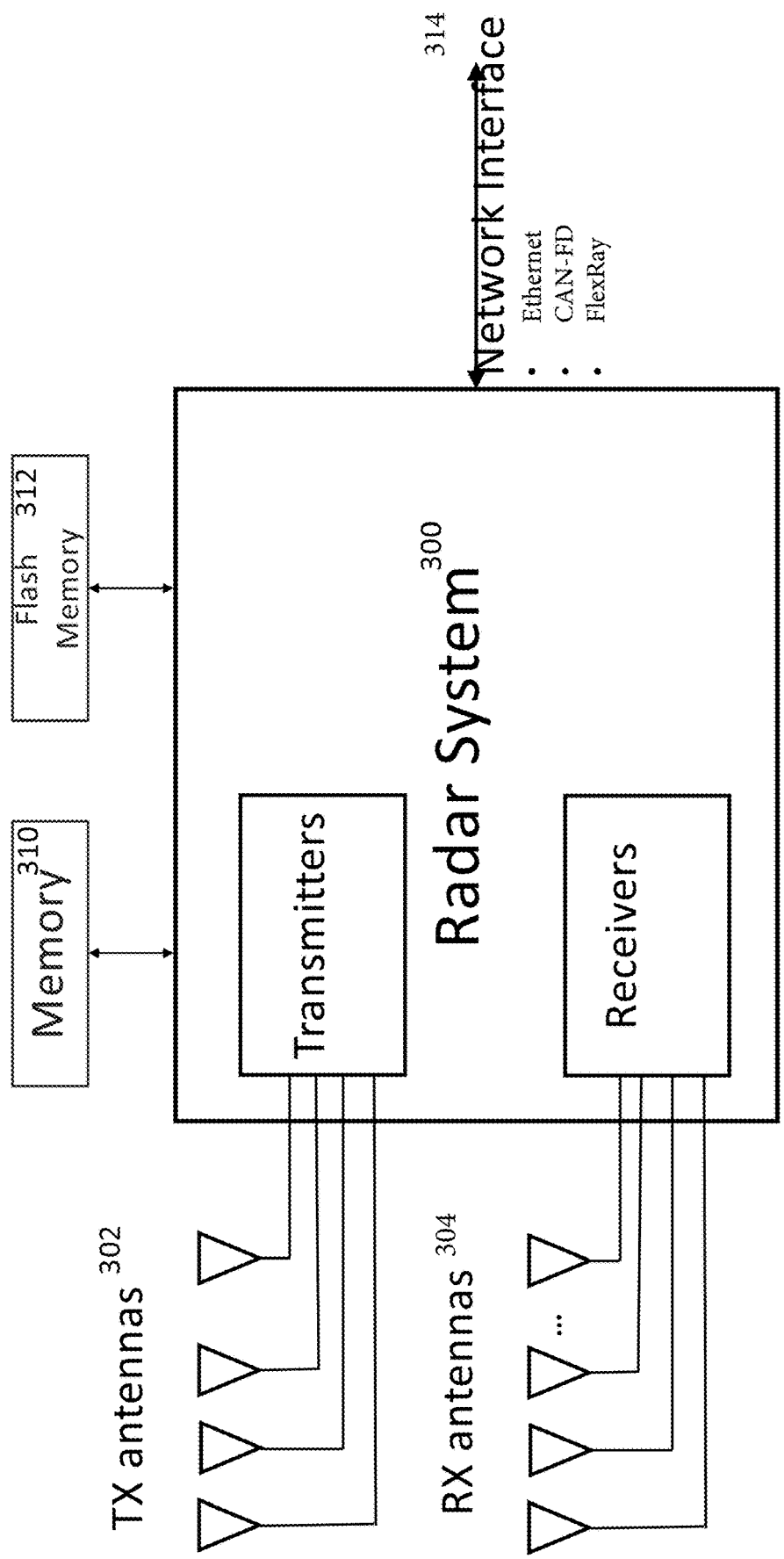
FIG. 3 is a block diagram illustrating a radar system using a single chip with a plurality of receivers and a plurality of transmitters in accordance with the present invention.

A radar system with multiple antennas, transmitters, and receivers is shown in FIG. 3. Using multiple antennas 302, 304 allows an exemplary radar system 300 to determine the angle (azimuth or elevation or both) of targets in the environment. Depending on the geometry of the antenna system different angles (e.g., azimuth or elevation) can be determined.

The radar system 300 may be connected to a network via an Ethernet connection or other types of network connections 314, such as, for example, CAN-FD and FlexRay. The radar system 300 may also have memory (310, 312) to store software used for processing the signals in order to determine range, velocity, and location of objects. Memory 310, 312 may also be used to store information about targets in the environment. There may also be processing capability contained in the application-specific integrated circuit (ASIC) 300 apart from the transmitters 302 and receivers 304.

The description herein includes an exemplary radar system in which there are $N_T$ transmitters and $N_R$ receivers for $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment.

There are several different types of signals that transmitters in radar systems employ. A radar system may transmit a pulsed signal or a continuous signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving.

Another classification of radar systems is the modulation of signal being transmitted. A first type of continuous wave radar signal is known as a frequency modulated continuous wave (FMCW) radar signal. In an FMCW radar system, the transmitted signal is a sinusoidal signal with a varying frequency. By measuring a time difference between when a certain frequency was transmitted and when the received signal contained that frequency, the range to an object can be determined. By measuring several different time differences between a transmitted signal and a received signal, velocity information can be obtained.

A second type of continuous wave signal used in radar systems is known as a phase modulated continuous wave (PMCW) radar signal. In a PMCW radar system, the transmitted signal from a single transmitter is a sinusoidal signal in which the phase of the sinusoidal signal varies. Typically, the phase during a given time period (called a chip period or chip duration) is one of a finite number of possible phases. A spreading code consisting of a sequence of chips, (e.g., +1, +1, −1, +1, −1 . . . ) is mapped (e.g., +1→0, −1→p) into a sequence of phases (e.g., 0, 0, p, 0, p . . . ) that is used to modulate a carrier to generate the radio frequency (RF) signal. The spreading code could be a periodic sequence or could be a pseudo-random sequence with a very large period, so it appears to be a nearly random sequence. The spreading code could be a binary code (e.g., +1 or −1). The resulting signal has a bandwidth that is proportional to the rate at which the phases change, called the chip rate $f_{chip}$, which is the inverse of the chip duration, $T_{chip}=1/f_{chip}$. In a PMCW radar system, the receiver typically performs correlations of the received signal with time-delayed versions of the transmitted signal and looks for peaks in the correlation as a function of the time-delay, also known as correlation lag. The correlation lag of the transmitted signal that yields a peak in the correlation corresponds to the delay of the transmitted signal when reflected off an object. The round-trip distance to the object is found by multiplying that delay (correlation lag) by the speed of light.

In some radar systems, the signal (e.g. a PMCW signal) is transmitted over a short time period (e.g. 1 microsecond) and then turned off for a similar time period. The receiver is only turned on during the time period where the transmitter is turned off. In this approach, reflections of the transmitted signal from very close targets will not be completely available because the receiver is not active during a large fraction of the time when the reflected signals are being received. This is called pulse mode.

The radar sensing system of the present invention may utilize aspects of the radar systems described in U.S. Pat. Nos. 10,261,179; 9,971,020; 9,954,955; 9,945,935; 9,869,762; 9,846,228; 9,806,914; 9,791,564; 9,791,551; 9,772,397; 9,753,121; 9,689,967; 9,599,702; 9,575,160, and/or 9,689,967, and/or U.S. Publication Nos. US-2017-0309997; and/or U.S. patent application Ser. No. 16/674,543, filed Nov. 5, 2019, Ser. No. 16/259,474, filed Jan. 28, 2019, Ser. No. 16/220,121, filed Dec. 14, 2018, Ser. No. 15/496,038, filed Apr. 25, 2017, Ser. No. 15/689,273, filed Aug. 29, 2017, Ser. No. 15/893,021, filed Feb. 9, 2018, and/or Ser. No. 15/892,865, filed Feb. 9, 2018, and/or U.S. provisional application, Ser. No. 62/816,941, filed Mar. 12, 2019, which are all hereby incorporated by reference herein in their entireties.

Digital frequency modulated continuous wave (FMCW) and phase modulated continuous wave (PMCW) are techniques in which a carrier signal is frequency or phase modulated, respectively, with digital codes using, for example, GMSK. Digital FMCW radar lends itself to be constructed in a MIMO variant in which multiple transmitters transmitting multiple codes are received by multiple receivers that decode all codes. The advantage of the MIMO digital FMCW radar is that the angular resolution is that of a virtual antenna array having an equivalent number of elements equal to the product of the number of transmitters and the number of receivers. Digital FMCW MIMO radar techniques are described in U.S. Pat. Nos. 9,989,627; 9,945,935; 9,846,228; and 9,791,551, which are all hereby incorporated by reference herein in their entireties.

Multi-Chip Synchronization:

The present invention provides a method for synchronization of multiple digital radar ASICs of a multi-chip MIMO radar system where each ASIC (chip) can support multiple transmitters and multiple receivers. By synchronizing the different ASICs, and therefore ensuring that all TXs can transmit exactly at the same time and all RXs can receive exactly at the same time, the overall performance of the radar system can be improved. Additional improvements which are possible with a multi-chip synchronized radar system include, e.g.

different ASICs can be used to process a different range region, or improve the total number of virtual receivers (angular resolution), or operate different scans on different ASICs, or boost the TX power, or provide more processing power by splitting up the RDC3 post processing on different ASICs.

As discussed herein, all transmitters and all receivers of an exemplary radar system operate in lockstep.

More specifically, all transmitters transmit their corresponding chips at the same time with respect to the START of the scan, and all receivers sample the received data at the same time with respect to the START of the scan. These conditions are grouped into two synchronization requirements for the multichip system:

Intra-Chip synchronization (synchronization within the ASIC) and

Inter-Chip synchronization. (synchronization between the ASIC).

Both are satisfied to better than 62.5 ps alignment accuracy to not appreciably affect the performance of the radar system. Processing/control commands can be passed between different ASICs e.g. using an Ethernet connection/switch.

Figure 8:
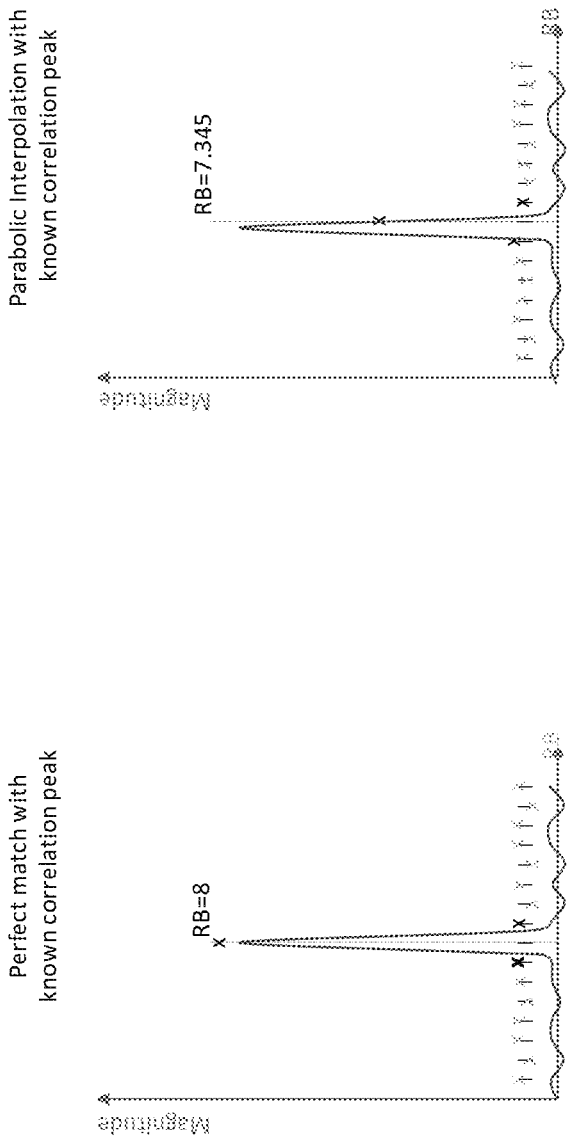
FIG. 8 is a diagram illustrating a perfect match with a known correlation peak output as well as an interpolated peak with a known correlation peak.

Intra-chip synchronization is used to synchronize all n RX's and all m TX's on each chip (FIG. 3). The m TX channels and n RX channels on each chip have independent clock dividers, which locally generate the corresponding sample clocks, derived from the common 16 GHz LO clock (FIG. 8). All individual dividers associated with the TX and RX channels are synchronized. Since these dividers cannot be synchronized by simply releasing them from reset at exactly the same time, a system was put in place which achieves synchronization by using a centralized clock gating method.

The first "START" signal will release the clock gating and ensure that all TX's and RX's are aligned for subsequent radar scans. There are other methods for intra-synchronization. In an aspect of the present invention, inter chip delays are controlled in increments smaller than a sample rate.

In addition to the exemplary intra-chip synchronization discussed herein, all TXs and RXs can also be delayed by a programmable sub-clock value to account for the different TX/RX routing on the board and chip. This delay can be achieved either through individual FIFOs (for a number of clocks) and through the use of, e.g., inverters to specify sub-clock delays on a per RX/TX basis.

Inter-chip synchronization: even though the intra-chip synchronization described above ensures that all 12 TX channels and 8 RX channels on each individual chip are in lockstep, one chip with respect to another can have a completely random timing relationship. Since each chip generates its own START of scan signal, the inter-chip timing relationship corresponds fundamentally to the inter-chip START timing relationship. The uncertain relative timing between STARTs is caused by three categories of uncertainty mechanisms:
1. START of scan uncertainty caused by inter-chip communication—a very large error, order of µs.
2. FIFO clock-domain-synchronizers—order of a few chip delays.
3. TX/RX channel clock generation on each chip resulting from dividing down from the 16 GHz LO clock—divider start uncertainty for the sample rate which can be e.g. 1 or 2 GHz.

Accordingly, the inter-chip synchronization will have three types of synchronization processes:
1. SW sync (getting closer to 1-2 µs accuracy)
2. Coarse sync (getting closer to 1 clock accuracy)
3. Fine sync (sub-clock accuracy).

Figure 4:
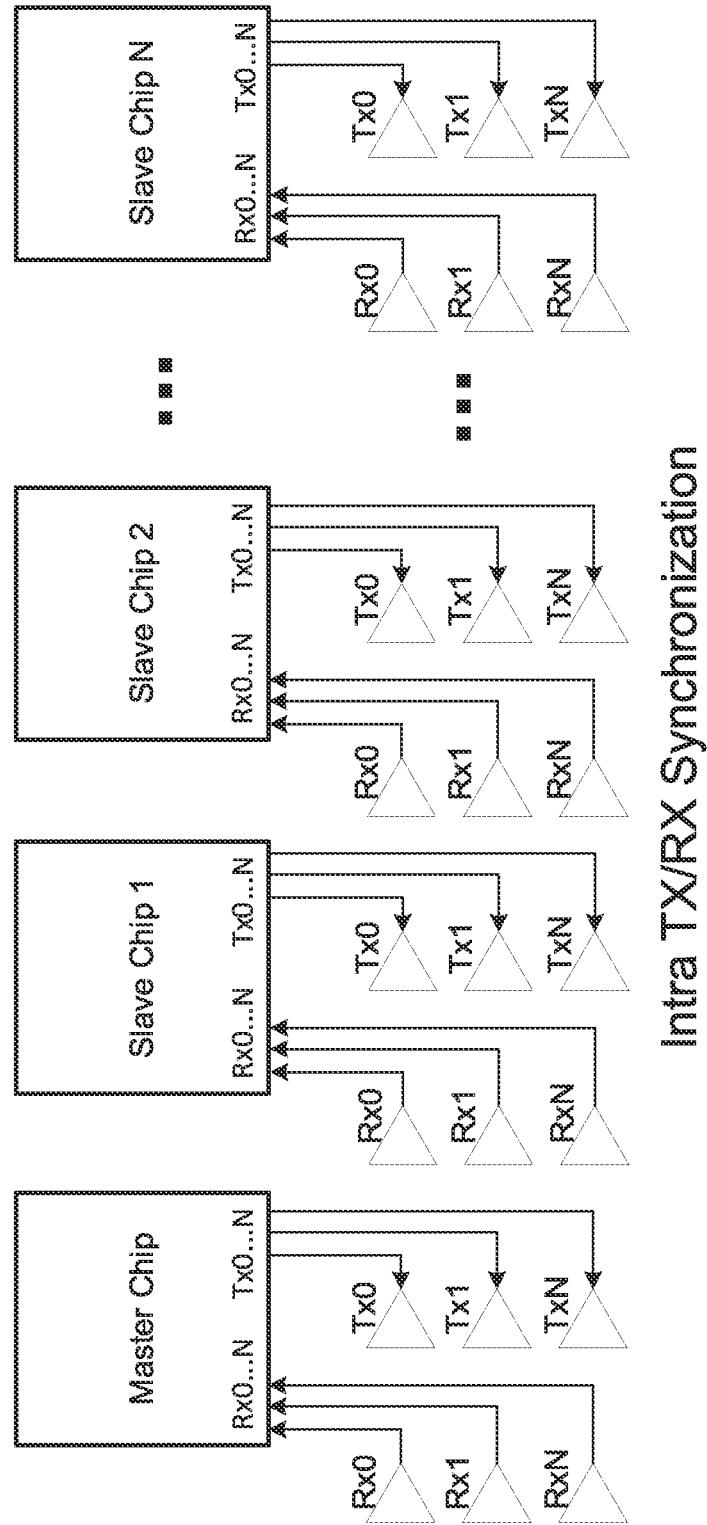
FIG. 4 is a block diagram illustrating a radar system with multiple chips, each with a plurality of receivers and a plurality of transmitters in accordance with the present invention.

The multi-chip arrangement, illustrated in FIG. 4, is as follows:
There is one ASIC chip assigned as "master;"
Each ASIC chip can contain multiple TX antennas and RX antennas; and
Each ASIC chip provides an internal synchronization scheme (intra TX/RX synchronization) to ensure the TX and RX's of each ASIC chip are properly aligned.

Figure 5:
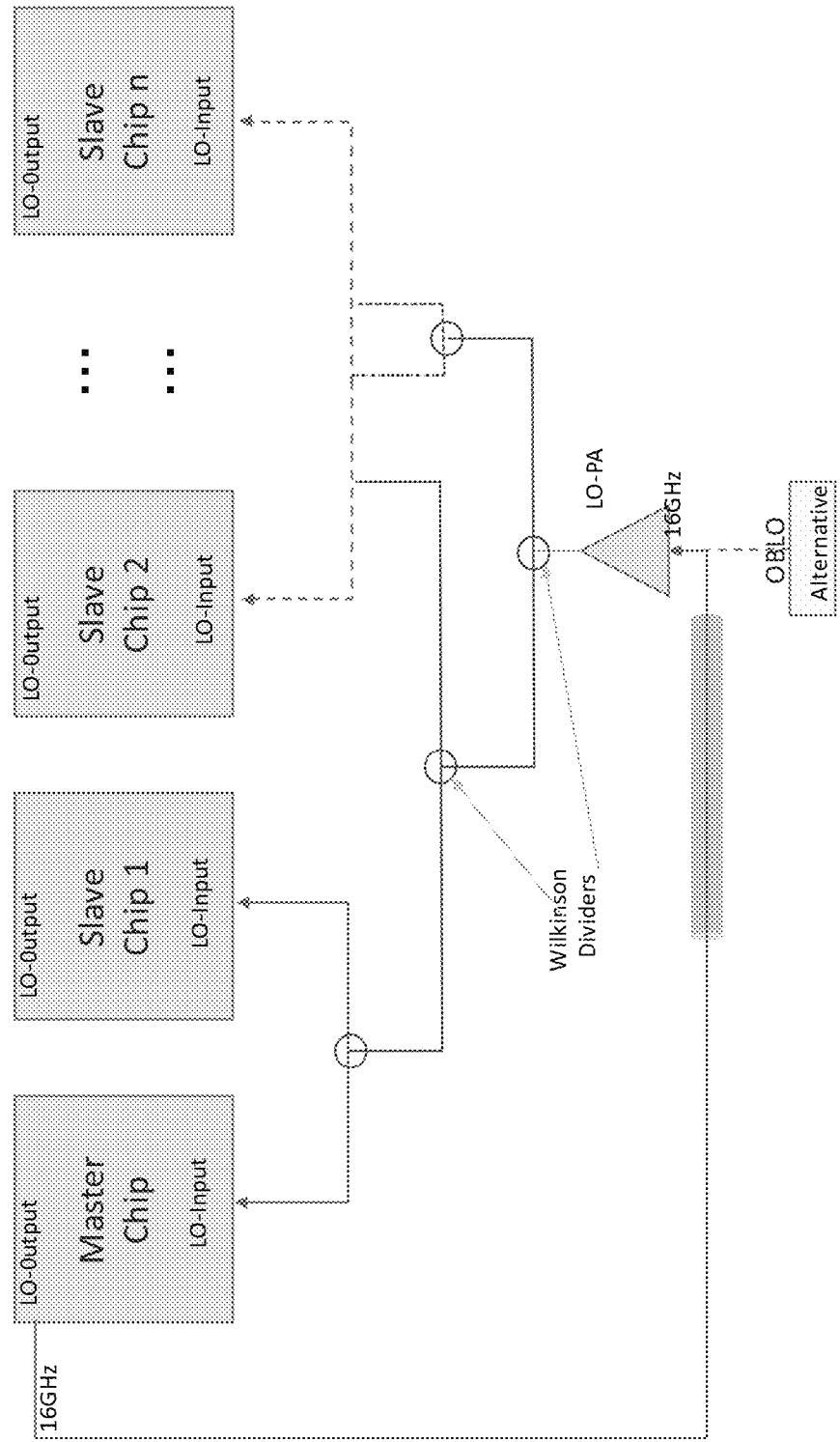
FIG. 5 is a diagram illustrating the local oscillator (LO) distribution from either a master chip or an alternative source to all chips to be synchronized in accordance with the present invention.

The multi-chip arrangement for clock distribution, illustrated in FIG. 5, is as follows:
There is one ASIC chip assigned as "master."
Exemplary embodiments use either a "master," which provides the 16 GHz reference clock to all slaves and the master device itself, or alternatively, an external LO will be used.
Wilkinson dividers are used to split the LO and to provide it to the different ASICs.
The distribution of the 16 GHz clock needs to be balanced so that all chips are phase aligned. The alignment impacts both the 80 GHz carrier phase alignment and the inter-chip VRX alignment.
The phase alignment requires matching lengths to within 0.93 mm (dk=4) for a better than 180° alignment at 80 GHz. The matching requirement is directly related to the beam-forming calibration range.

Figure 6:
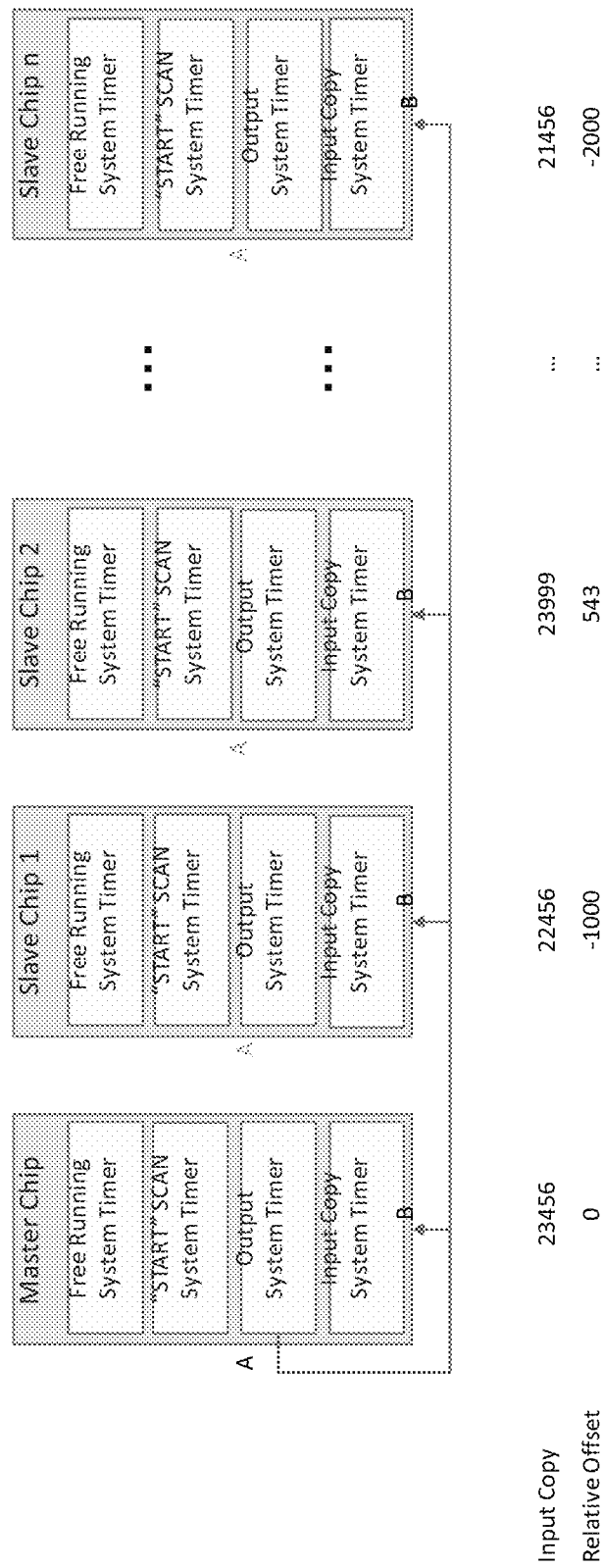
FIG. 6 is a diagram illustrating the use of a free running system timer which can be used for rough clock synchronization in accordance with the present invention.

The multi-chip arrangement for rough clock synchronization, illustrated in FIG. 6, is as follows:
There is one ASIC chip assigned as "master."
Each ASIC chip contains a free running system timer for controlling the timing of the "START" of a scan. The free running system timer is started when the chip is released from reset. The start of a scan is scheduled relative to the internal free running system timer. For example, scheduling the "START of a Scan at z" means that the START will be issued when the internal free running timer reaches value z.
After reset, the system needs to identify the relative offset between each free running system timer across all chips.

In an exemplary process, the synchronization process follows the steps listed below:
Each ASIC chip can generate an output signal A at a programmable time relative to the free running system timer.
Each ASIC chip can monitor an input signal B and copy the current value of the free running system timer into an internal register, e.g. at the rising edge of the input signal.
In order to perform a rough clock synchronization, the "master" chip will assert the output signal A at a specific time in the future and all slave chips (can also include master) are programmed to copy their system timer value as soon as they detect a rising edge on the input signal B.
Based on the difference of the retrieved input copy of each ASIC, the Master chip can compute the relative offset of each free running system counter compared to the master free running system counter.
This allows synchronization of all chips within 1-2 µs accuracy using a normal GPIO signal which can operate at a lower frequency (e.g. 200 MHz).
Other synchronization methods can be used, e.g., Ethernet based synchronization, PTP. The more accurate the SW synchronization, the faster the convergence to a fully lock-stepped system.

Figure 7:
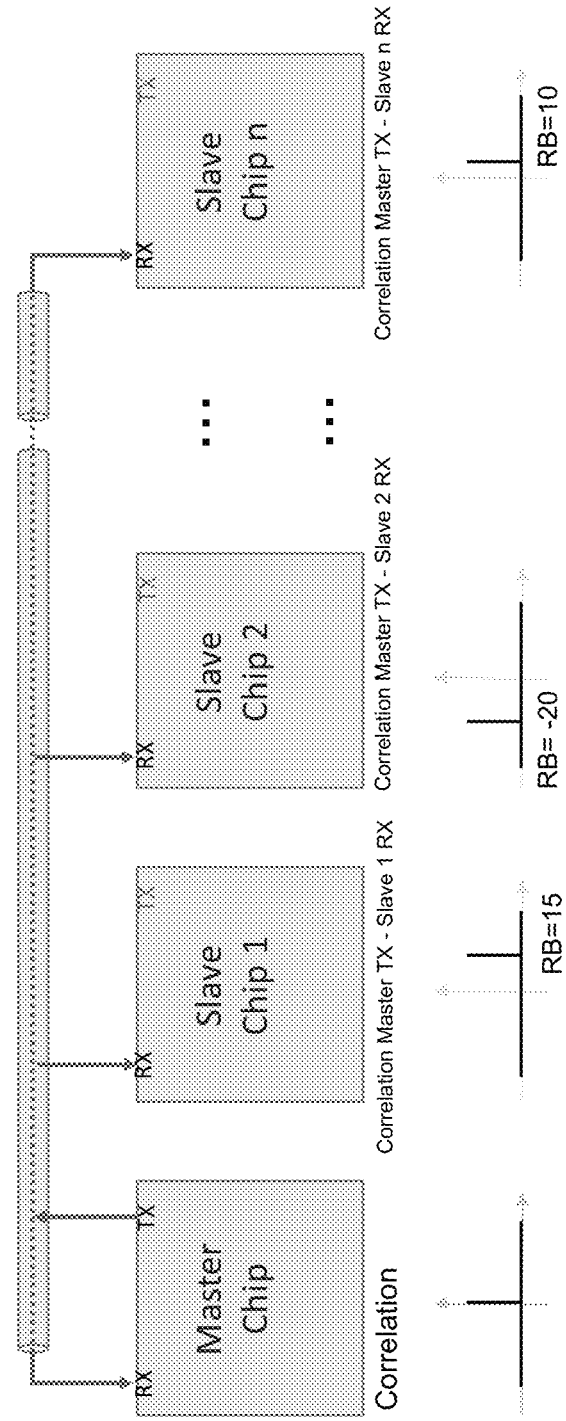
FIG. 7 is a diagram illustrating the use of mini radarscans (e.g. for a single pulse repetition interval) which is provided through either a dedicated TX or a coupled TX and forwarded through a direct connect or over the air to the other slave chips in accordance with the present invention.

The multi-chip arrangement for coarse/fine synchronization, illustrated in FIG. 7, is as follows:
There is one ASIC chip assigned as "master."
Exemplary embodiments use either a direct path from the "master" TX to all RX of all chips in the multichip system or spill-over. A direct path could be one dedicated TX to one RX pin of each of the slave devices.
The Master ASIC will perform a small scan for one PRI, e.g. transmit 10,000 chips at 2 GHz chip rate with, for example, a known PRBS pattern. The slave chips are programmed to capture a SCAN, for example, 2.5 µs before the master starts transmitting (5,000 chips/2 GHz=2.5 µs based on the known offsets from the free running system timer achieved through.
Each slave chip is configured to receive, for example, 10,000 chips and correlates against the known PRBS pattern which was sent out by the master chip.
Depending on the range bin where the correlation peak from the master TX was detected, the "offset" for each slave chip can be further refined, since the range bin provides the exact delay between the master TX and the RX on the slave chips.
Based on this synchronization, the "offset" for each slave chip can now be properly adjusted (2 GHz). Assume the original offset between master and slave chip 1, in regard to the system timer, was −1,000 and the correlation result places the TX pattern at range bin 15 on the slave chip 1. That means the slave chip 1 started the correlation 15 chips too early and the corrected offset should have been −1000+15=−985. So, if the master schedules a scan to be performed at time X, slave chip 1 should start its "START" scan at time Y=X−985 (see FIGS. 6 and 7).

If the correlation peak cannot be observed because it fell outside the correlation window, the chip rate shall be reduced to half of the initial frequency and the previous step repeated. This situation may appear if software synchronization is based on Ethernet as opposed to the hardwired method illustrated in FIG. 6. Alternatively, the chip rate can initially be started low, for example, 125 MHz, and increased to 2 GHz after the offset was adjusted by the amount identified by the correlation peak range bin.

The correlation output from an exemplary coarse/fine synchronization illustrated in FIG. 7 can also be used for fine synchronization. The Fine Synchronization step ensures that the data converters sampling clocks are synchronous across all chips in the system to a relative time accuracy smaller than the sampling clock period, a.k.a. sub-clk synchronization.

If, for a given slave chip, the master and slave clocks are in perfect phase alignment, the correlation peak output should reach the maximum possible magnitude with respect to the adjacent range bin correlation magnitudes. The adjacent range bin magnitudes are smaller and equal to one another. If the master and slave clock phase alignment is off by a small fraction, the adjacent correlation range bin magnitudes are imbalanced. In that case, the sub range bin offset can be extracted from the correlation output through, for example, parabolic or quadratic interpolation.

The fractional part of the interpolated correlation peak range bin can be used to determine the actual sub-clock time delay by dividing the fractional part with the chip rate, e.g. 0.345/2 GChips/s=0.1725 ns. That time delay can be compensated by the hardware described below.

Figure 9:
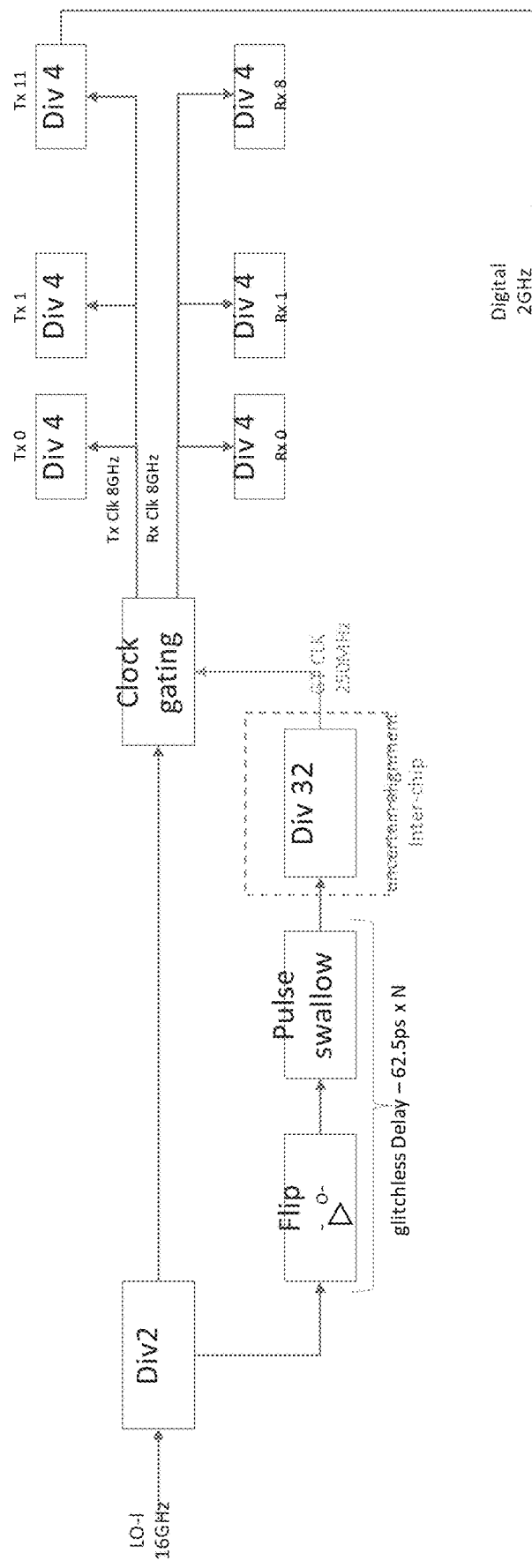
FIG. 9 is a diagram illustrating the hardware components for "pulse swallowing" to control the alignment across chips.

Each exemplary chip contains the HW shown in FIG. 9 to support the fine synchronization process. The pulse-swallow block can be controlled to skip one 8 GHz pulse. When a pulse is skipped, the div-32 block state does not advance, therefore, the 250 MHz clock edges will be delayed by 125 ps. The glitchless flip circuit allows for a delay of 62.5 ps to be realized. The pulse-swallow and flip blocks provide a mechanism through which the state of the div-32 blocks on each chip of the multi-chip system can be independently controlled (delayed) in 62.5 ps increments.

The clock gating block, which can stop and restart the 8 GHz clock going to all 12 TX and 8 RX dividers, is used for intra-chip synchronization. Since the 8 GHz clock distribution is using transmission lines, the first rising edge of the restarted clock arrives at the input of all 20 dividers at substantially the same time (<30 ps error). Intra-chip synchronization is accomplished by stopping the 8 GHz clock, asynchronously resetting all 20 dividers, and restarting the clock.

Even though the command to restart the TX/RX clocks can be issued at any time, asynchronously, the clock gating block will release the TX and RX clocks only when the rising edge of the 250 MHz GTCLK occurs. This extra synchronization clock was put in place to support TDM operation, which requires the repeated synchronization of the RX dividers only.

The actual number of clock pulses to be swallowed for the fine alignment can be computed by diving the sub clock time, e.g. 0.1725 ns/62.5 ps=2.76≈3. That means we need to swallow 3 elks (@16 GHz), which is the same as 1 clk 8 GHz together with the inverter. In case the sub-clock time is larger than ½*1/(2 GChips/s)=0.25 ns.

Figure 10:
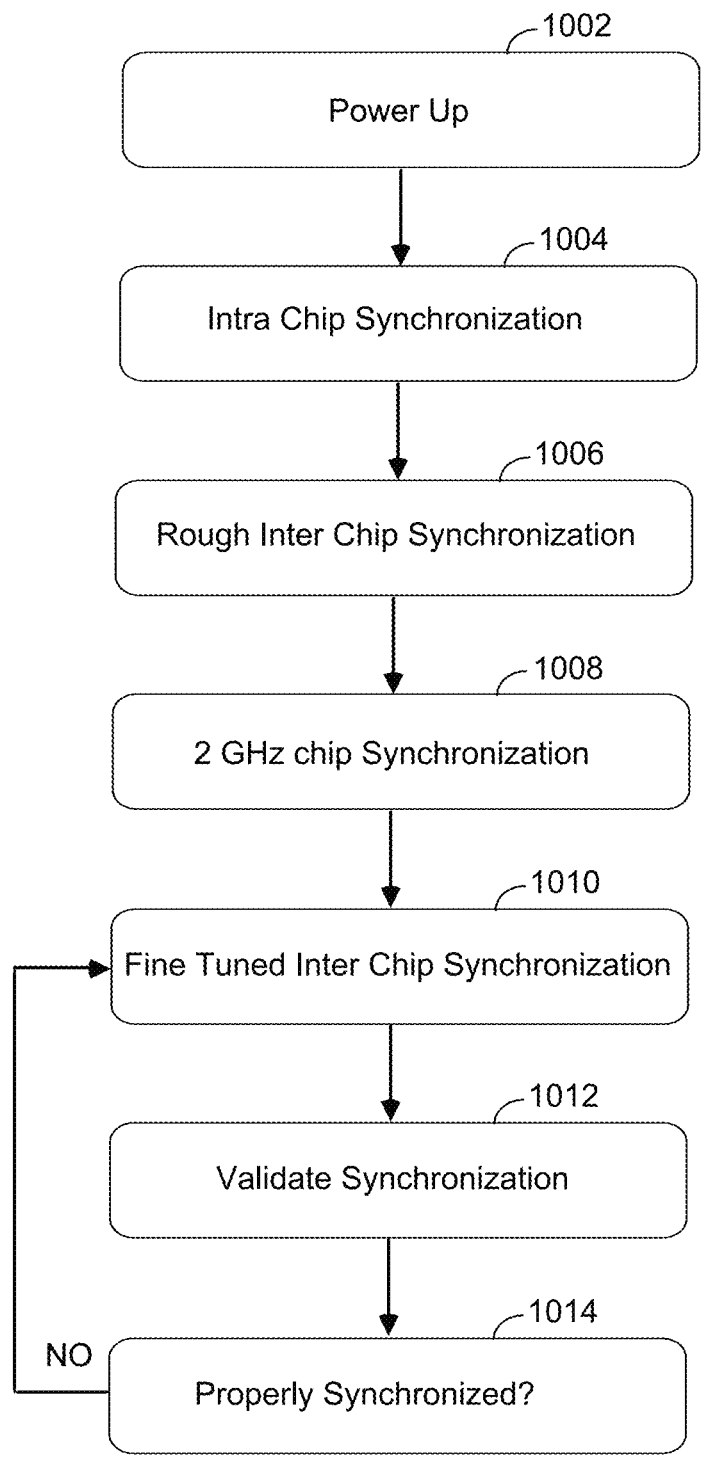
FIG. 10 is.

FIG. 10 illustrates the steps to an exemplary method for synchronizing the chips of a multi-chip MIMO radar system. In step 1002 of FIG. 10, the radar system is powered up. In powering the radar system, each chip of a plurality of chips are powered up and clocks on each chip are started. In step 1004 of FIG. 10, intra chip synchronization is performed. Such intra chip synchronization includes the use of an internal synchronization signal (e.g., a START signal) on each chip that synchronizes all transmitter dividers and all receiver dividers to transition on a same edge of an LO-I 16 GHz input clock. By using such a START signal, all transmitters and receivers of a chip will be synchronized and the synchronization should not change between a new START signal initiation assuming no clocks were stopped.

In step 1006 of FIG. 10, a rough inter chip synchronization is performed. Such rough inter chip synching uses a signal between each of the chips to roughly synchronize an internal timer (e.g., 2 GHz), such that the chips will be synchronized to within 10-100 ns.

In step 1008 of FIG. 10, a 2 GHz chip synchronization is performed. This 2 GHz chip synchronization is performed on a master chip of the plurality of chips. A small scan (e.g., one pulse repetition interval) can be transmitted by the master chip using a known pattern. The transmitted pattern is correlated by the master Chip as well as on each slave chip of the plurality of chips. A correlation output can then be used to adjust internal timer offsets (e.g., 2 GHz) of each slave chip, such that subsequent scans will start at a proper clock boundary and range bin (RB) 0 will be aligned across all chips.

In step 1010 of FIG. 10, fine-tuned inter-chip synchronization is performed. Such fine-tuned inter-chip synchronization includes the use of inter-rangebin interpolation to compute sub-chip misalignments between the master chip and the slave chips. The determined misalignment can be corrected via "pulse swallowing" (in 62.5 ps increments) the required number of clock pulses to ensure that the subsequent scans are aligned to the desired tolerance level.

In step 1012 of FIG. 10, the inter-chip synchronization is validated to ensure that the scans are properly synchronized on a sub-chip accuracy. In step 1014 of FIG. 10, if the validation fails, the process returns to step 1010 to repeat the fine-tuned inter-chip synchronization, after which, the synchronization validation in step 1012 is repeated.

Thus, embodiments of the present invention provide methods and a system for improving performance of a radar system through the synchronization of multiple radar system ASCIs that make up a MIMO radar system. As described herein, after each chip of a multi-chip radar system is individually synchronized, a single scan from a master chip of a plurality of chips of the radar system is used to synch slave chips of the plurality of chips to the master chip. Further synchronization is performed through inter-rangebin interpolation to compute a sub-chip misalignment that may be adjusted by removing ("pulse swallowing") a desired number of clock pulses to align subsequent scans. Thus, all the transmitters and receivers of a given chip of the plurality of chips will be synchronized with all the transmitters and receivers of another chip of the plurality of chips to within a desired tolerance level. By synchronizing the different chips of the radar system, and therefore ensuring that all transmitters of the radar system can transmit exactly at the same time and all receivers of the radar system can receive exactly at the same time, the overall performance of the radar system can be improved.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A multi-chip MIMO radar system comprising a plurality of chips, the MIMO radar system comprising:
   a first integrated circuit chip (chip) of the plurality of chips comprising a first plurality of transmitters and a first plurality of receivers; and
   a second chip of the plurality of chips comprising a second plurality of transmitters and a second plurality of receivers;
   wherein the second chip is configured to align an own internal timing clock value of the second chip with respect to a reference clock signal, and wherein the first chip is configured to align an own internal timing clock value of the first chip with respect to the reference clock signal, wherein the reference clock signal is defined by the first chip, such that the internal timing clock value of the second chip is aligned to the internal timing clock value of the first chip, and the first pluralities of transmitters and receivers are respectively synchronized with the second pluralities of transmitters and receivers; and
   wherein the second chip is configured to delay the reference clock signal at the second chip by a selected multiple of a sub-value of the reference clock signal such that the delay of the reference clock signal at the second chip accounts for propagation delays of the reference clock signal.

2. The multi-chip MIMO radar system of claim 1, wherein each chip of the plurality of chips is configured to perform an intra synchronization such that all transmitters and receivers of each chip are synchronized.

3. The multi-chip MIMO radar system of claim 2, wherein each chip of the plurality of chips comprises a local clock operable to generate a common clock signal, wherein each chip is configured to divide a respective common clock signal such that each transmitter and receiver of each respective chip receives a respective sample clock signal derived from the respective common clock signal, and wherein each chip is configured to synchronize respective transmitter clock dividers and receiver clock dividers to transition on a same edge as their respective common clock signals.

4. The multi-chip MIMO radar system of claim 2, wherein each chip is individually operable to delay clock signal values by selected multiples of a sub-clock value to account for different transmitter/receiver routing on the respective chips.

5. The multi-chip MIMO radar system of claim 1, wherein the first chip is a MASTER chip and each of the other chips of the plurality of chips are SLAVE chips, such that the SLAVE chips synchronize their operations with respect to the MASTER chip.

6. The multi-chip MIMO radar system of claim 1 comprising a reference clock operable to transmit the reference clock signal that is received by the first and second chips, wherein the second chip is configured to synchronize with the first chip with respect to the reference clock signal received by the first and second chips.

7. The multi-chip MIMO radar system of claim 1, wherein the first chip comprises a reference clock operable to transmit the reference clock signal that is received by the first and second chips, and wherein the second chip is configured to synchronize with the first chip with respect to the reference clock signal received by the first and second chips.

8. The multi-chip MIMO radar system of claim 1, wherein a first portion of the plurality of chips are used for a first scan, and wherein a second portion of the plurality of chips are used for a second scan.

9. The multi-chip MIMO radar system of claim 1, wherein a first portion of the plurality of chips performs a first portion of post processing of received data, and wherein a second portion of the plurality of chips performs a second portion of the post processing of the received data.

10. A method for synchronizing the chips of a multi-chip MIMO radar system, the method comprising:
    powering up each chip of a plurality of chips and starting local clocks of each chip;
    intra synchronizing transmitters and receivers of each chip of the plurality of chips;
    performing a first synchronization of the plurality of chips with respect to a reference clock signal received by each of the plurality of chips, wherein the reference clock signal is defined by a first chip of the plurality of chips, wherein the first synchronization comprises synchronizing respective own timers of the plurality of chips to the reference clock signal; and
    performing a second synchronization of the plurality of chips, wherein the second synchronization comprises:
        transmitting, with the first chip of the plurality of chips, a scan of a selected duration comprising a selected quantity of codes of a selected pattern;
        receiving, with the plurality of chips, the radio signal that is the transmitted scan;
        correlating, with the plurality of chips, the received radio signal;
        using the correlation output of a second chip of the plurality of chips to determine an offset between the second chip and the first chip; and
        adjusting a clock signal of the second chip such that the offset between the first chip and the second chip is reduced to below a threshold value;
        wherein adjusting a clock signal of the second chip comprises delaying the reference clock signal at the second chip by a selected multiple of a sub-value of the reference clock signal; and
    wherein the second synchronization of the plurality of chips synchronizes the transmitters and receivers of the second chip to the transmitters and receivers of the second first chip to account for a propagation delay of the reference clock signal.

11. The method of claim 10, wherein each chip of the plurality of chips comprises a local clock signal that is divided such that each transmitter and receiver of each respective chip receives a respective sample clock that is derived from their respective common clock signals, and wherein intra synchronizing the transmitters and receivers of each chip comprises initiating a START signal on each chip that synchronizes all respective transmitter dividers and all receiver dividers to transition on a respective same edge of their respective clock signals, such that the transmitters and receivers of each respective chip are synchronized.

12. The method of claim 11, wherein each chip individually delays each of their respective clock signal values by selected multiples of a sub-clock value to account for different transmitter/receiver routing on the respective chips.

13. The method of claim 10, wherein the first chip is a MASTER chip and each of the other chips of the plurality of chips are SLAVE chips, such that the SLAVE chips synchronize their operations with respect to the MASTER chip.

14. The method of claim 13, wherein performing the first synchronization of the plurality of chips comprises transmitting, with a reference clock of the first chip, the reference clock signal, wherein the reference clock signal is used to synchronize timers of each SLAVE chip to a timer of the MASTER chip.

15. The method of claim 13, wherein performing the first synchronization of the plurality of chips comprising transmitting, with a reference clock of the radar system, the reference clock signal, wherein the reference clock signal is used to synchronize timers of each SLAVE chip to a timer of the MASTER chip.

16. The method of claim 10, wherein the first synchronization of the plurality of chips synchronizes the plurality of chips to within 10-100 ns.

17. The method of claim 10, wherein the duration of the transmitted scan is one pulse repetition interval.

18. The method of claim 10, wherein the second synchronization of the plurality of chips comprises the use of inter-range bin interpolation to compute a sub-chip misalignment between the first chip and every other chip of the plurality of chips, and wherein correcting the misalignment comprises removing a selected number of clock pulses such that subsequent scans are aligned to the desired degree of synchronization.

19. The method of claim 10, wherein a first portion of the plurality of chips are used for a first scan, and wherein a second portion of the plurality of chips are used for a second scan.

20. The method of claim 10, wherein a first portion of the plurality of chips performs a first portion of post processing of received data, and wherein a second portion of the plurality of chips performs a second portion of the post processing of the received data.

* * * * *

UNITED STATES PATENT AND TRADEMARK OFFICE
CERTIFICATE OF CORRECTION

PATENT NO. : 11,977,178 B2
APPLICATION NO. : 16/816899
DATED : May 7, 2024
INVENTOR(S) : Monier Maher et al.

It is certified that error appears in the above-identified patent and that said Letters Patent is hereby corrected as shown below:

In the Specification

Column 9
Line 65, "elks" should be -- clks --
Line 65, insert -- @ -- after "1 clk"

Column 10
Line 29, insert -- = -- after "(RB)"

Signed and Sealed this
Twenty-second Day of October, 2024

Katherine Kelly Vidal
*Director of the United States Patent and Trademark Office*